United States Patent [19]
Gerlach

[11] 3,802,475
[45] Apr. 9, 1974

[54] FASTENER AND FASTENER RECEIVING DEVICE CONSTRUCTION INCORPORATING ANTI-BACKOUT RESISTANCE

[75] Inventor: John R. Gerlach, Monterey Park, Calif.

[73] Assignee: Emhart Corporation, Bloomfield, Conn.

[22] Filed: May 4, 1972

[21] Appl. No.: 250,251

[52] U.S. Cl. .................................... 151/39, 151/41
[51] Int. Cl. ........................................... F16b 39/32
[58] Field of Search ............ 151/39, 40, 41, 41.5, 9, 151/10, 13; 292/357

[56] References Cited
UNITED STATES PATENTS

| | | | |
|---|---|---|---|
| 2,642,302 | 6/1953 | Young | 292/357 |
| 2,811,384 | 10/1957 | Schmid | 292/357 |
| 947,680 | 1/1910 | Hord | 151/40 |
| 74,060 | 2/1868 | Elliot et al. | 151/39 |
| 765,991 | 7/1904 | Pickard | 151/39 |
| 843,720 | 2/1907 | Waddell et al. | 151/41.5 |
| 912,657 | 2/1909 | Fahner | 151/40 |
| 985,184 | 2/1911 | Lee | 151/41 |
| 1,595,175 | 8/1926 | Voson | 151/41 |
| 2,042,267 | 5/1936 | McCulloch | 151/41 |

FOREIGN PATENTS OR APPLICATIONS

| | | | |
|---|---|---|---|
| 20,034 | 12/1895 | Great Britain | 151/39 |

Primary Examiner—Edward C. Allen
Attorney, Agent, or Firm—Mahoney, Schick & Cislo

[57] ABSTRACT

A threaded fastener has diametrically opposite, generally axially extending and generally radially oriented shoulders formed on its head annular under surface, the shoulders facing the circumferential direction opposite the circumferential direction of progressive engagement of the fastener threaded shank. Also, the fastener head under surface has a flat and then tapers progressively from each shoulder in the shoulder facing circumferential direction from the recessed surface level over approximately one-quarter the head circumference to a flat raised surface level and then remains at this raised surface level to the other shoulder. The fastener receiving device has an annular receiving surface radially outwardly of a fastener opening and axially facing the fastener head under surface which is nearly the mirror image of the fastener head annular under surface so as to present opposing shoulders. Thus, when the fastener is installed, the receiving surface shoulders circumferentially face and are engageable by the fastener under surface shoulders for resisting rotation of the fastener in a direction opposite the circumferential direction of progressive engagement to provide anti-backout resistance.

2 Claims, 8 Drawing Figures

PATENTED APR 9 1974 3,802,475
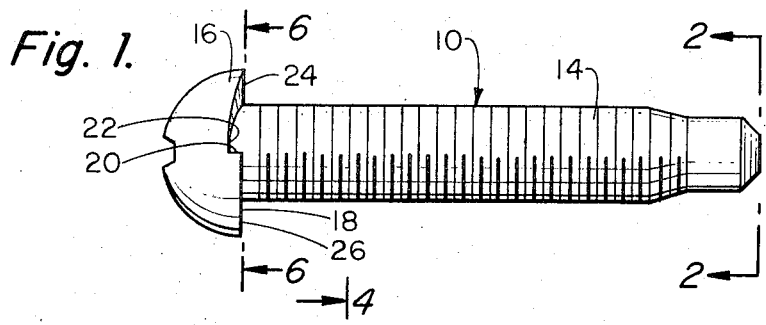
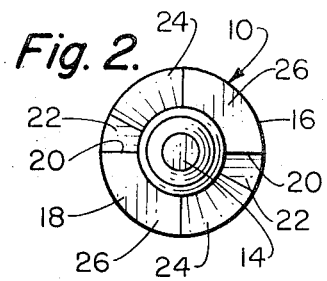
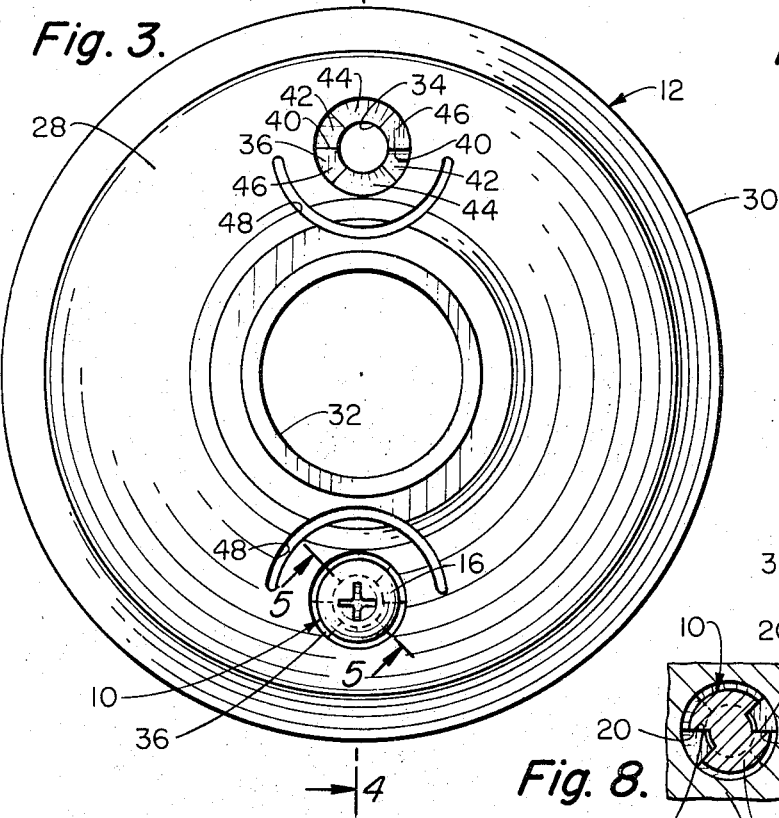
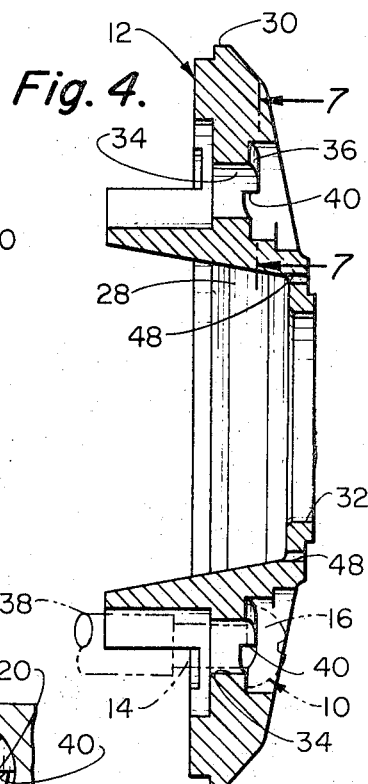
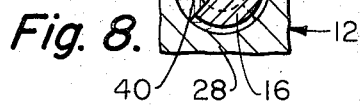
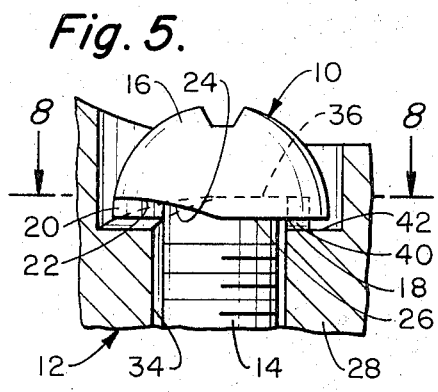
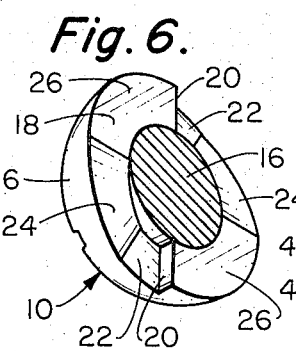
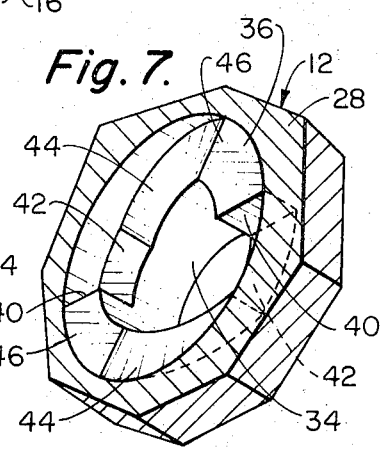

3,802,475

FASTENER AND FASTENER RECEIVING DEVICE CONSTRUCTION INCORPORATING ANTI-BACKOUT RESISTANCE

BACKGROUND OF THE INVENTION

This invention relates to fastener and fastener receiving device constructions incorporating anti-backout resistance and more particularly, to cooperating threaded fastener and fastener receiving devices which insure a maximum anti-backout resistance once properly engaged to thereby provide a complete insurance against an accidental disengagement of the fastener from the fastener receiving device which may be occasioned as a result of vibrations, periodic impacts and other common and usual forces encountered during use. Furthermore, the cooperating threaded fasteners and fastener receiving devices of the present invention are particularly useful in securing latches and the like in doors wherein the fastener and fastener receiving device assemblies are subject to vibrations and forces from the usual opening and closing movements of the doors during common use as well as other similar applications subject to similar forces and abuses during the use thereof.

It has been common practice, prior to the present invention, to secure latches in operable positions in doors by the use of common threaded fasteners received in fastener receiving devices forming portions of the latches, such as rosettes and other exterior plate members. It is, of course, fundamental that during use of the doors in the usual opening and closing movements, the doors necessarily close against an abutting door jamb surface, the impact thereof, causing vibrations travelling through the door and through the various door components. The result is that these impact vibrations subject the threaded fasteners of the latch to similar vibrations tending to cause the threaded fasteners to reversely rotate from their threaded engagement and ultimately loosen the entire latch mounting.

Various attempts have been previously made to cure this troublesome problem, but none have been completely successful for various reasons. For instance, one of the most obvious answers would be the use of common, split-ring type, lock washers. The split-ring lock washers are formed of spring metal with the washer axially deformed to axially offset the washer split ends. The split-ring lockwashers are positioned beneath the fastener head and overlying the normally abutting surface of the fastener receiving device so that threaded engagement of the fastener with the fastener receiving device causes the fastener head to deform the lock washer against the surface of the fastener receiving device so as to exert axial pressure therebetween and resist back-out rotational movement of the fastener under the vibrational and impact conditions.

The principal difficulty with split-ring lock washers for these purposes, and particuarly use in securing latches in doors, is that the lock washers, to be effective and perform their proper function, must be positioned at an outer surface of exterior rosette plates or other latch mounting plate formations. This places the lock washers in a position for ready view of an observer and greatly inhibits the overall aesthetics of the latch and door. In addition, the split-ring lock washers are necessarily separate from the fasteners and fastener receiving devices prior to assembly thereof, resulting in the same being misplaced prior to assembly or accidentally not used where required, completely eliminating the effectiveness thereof.

Still another attempted solution to the problems has been the use of particularly formed and fabricated fastener receiving devices which are provided with plastic washers molded directly to the fastener receiving devices around the threaded openings thereof. The plastic washers are formed of lesser internal diameters than the fastener threads so that as the fastener is threaded into the fastener receiving device, the fastener threads must slightly expand the plastic ring by interference therewith and thereby engages into the plastic ring. This exerts a pressure between the plastic ring and the fastener threads so as to resist rotatable movement of the fastener, once positioned, thereby resisting back-out movement of the fastener under the vibrational and impact forces.

Again, however, difficulties are presented including one or more of added expanse, a difficulty of incorporation into a fastener receiving device construction and excessive space requirements thereof. For instance, in the mounting of latches in doors, the threads of the fastener are frequently engaged through a rosette or other decorative mounting plate and into the latch proper so that the threaded opening engaging the fastener threads is internally of the main internal portion of the latch. Thus, the plastic ring for effectively solving the problem in this construction must be molded directly on the latch proper presenting the problems of expense and difficulty of incorporation, that is, unless a separate nut for engagement with the fastener is used having the plastic ring molded thereon, and in this case, space requirements become a definite problem, as well as difficulties in assembly.

OBJECTS AND SUMMARY OF THE INVENTION

It is, therefore, an object of this invention to provide fastener and fastener receiving device constructions incorporating anti-backout resistance which are of relatively simple form and cooperate during threaded engagement thereof to ensure retention of engagement under relatively high vibratory, impact and other abusive forces tending to cause movements of the fasteners relative to the fastener receiving devices which could cause ultimate loosening and disengagement therebetween. According to the present invention, at least one specifically formed shoulder on the fastener head under surface engages in a specific and unique manner with an opposing shoulder or shoulders on the mating surface of the fastener receiving device as the fastener is threadably and securely engaged with the fastener receiving device. A resulting back-out interference engagement is provided between the fastener and the fastener receiving device by the unique shoulder engagement which resists the reverse threading of the fastener required for the loosening action, thereby resisting the vibratory, impact and other abusive forces tending to create such loosening action.

It is a further object of this invention to provide fastener and fastener receiving device constructions incorporating anti-backout resistance, which, despite their relatively simple, but superior anti-backout resistance, are relatively easily engageable in the usual manner of fastener and fastener receiving devices not incorporating such features. The cooperating shoulders of the fastener and fastener receiving devices are formed so as to automatically engage and properly cooperate for the anti-backout resistance without any special positioning or manipulation beyond the usual screw threading of fasteners in their fastener receiving devices. Furtheremore, due to the particular and specifically calculated taper formations on and cooperating with the various mating surfaces and interference engaging shoulders, the tightening engagement of the fasteners with the fastener receiving devices is virtually the same as with prior fasteners and fastener receiving devices, yet anti-backout resistance is automatically provided through such engagement far superior over that heretofore possible.

It is still a further object of this invention to provide fastener and fastener receiving device constructions incorporating anit-backout resistance wherein all of the necessary components forming the ultimate anti-backout resistance are formed directly on the usual mating surfaces of the fastener and fastener receiving devices merely through a particular formation thereof and without the addition of any other materials. Thus, there are no increased space requirements either as to original fastener or fastener receiving device size or as to proper functional engagement therebetween. At the same time, despite the maximum efficiency in compactness, the maximum functional superiority is possible.

It is also an object of this invention to provide fastener and fastener receiving device constructions incorporating anti-backout resistance which, even with the superior performance thereof, do not detract from the aesthetic appeal of the devices in which they are incorporated and with which they are used. Due to the direct formation of the cooperating components for producing the results stated, that is, on the fastener head under surface and the facing and mating surface of the fastener receiving device, once the fastener is properly engaged with the fastener receiving device, the anti-backout resistance components are completely hidden from exterior view and are not apparent even to the most scrupulous observer. The aesthetics of the assembly, therefore, regardless of the particular application of the fastener are completely free of any alteration from those normally present.

Other objects and advantages of the invention will be apparent from the following specification and the accompanying drawing which are for the purpose of illustration only.

BRIEF DESCRIPTION OF THE DRAWING:

FIG. 1 is a side elevational view of a conventional threaded fastener, but incorporating a preferred embodiment of the anti-backout resistance principals of the present invention;

FIG. 2 is a bottom plan view of the fastener of FIG. 1;

FIG. 3 is a top plan view of a fastener receiving device, in this case, a rosette for a conventional door latch assembly incorporating a preferred embodiment of the anti-backout resistance principals of the present invention, one fastener receiving opening of the rosette being free of having a fastener assembled therein and the other opening having the fastener of FIGS. 1 and 2 assembled therein;

FIG. 4 is a partial vertical and partial angular cross-sectional view looking in the direction of the arrows 4—4 in FIG. 3;

FIG. 5 is an enlarged, fragmentary, vertical cross-sectional view looking in the direction of the arrows 5—5 in FIG. 3 and with the fastener of FIGS. 1 and 2 assembled therewith;

FIG. 6 is a fragmentary, perspective view, part in elevation and part in section, of the fastener of FIG. 5 showing the head underside configuration contour in detail;

FIG. 7 is a view similar to FIG. 6, but of the fastener receiving device of FIG. 5; and FIG. 8 is a reduced, horizontal sectional view, part in elevation, looking in the direction of the arrows 8—8 in FIG. 5.

DESCRIPTION OF THE BEST EMBODIMENT CONTEMPLATED:

Referring to the drawing, an embodiment of a fastener incorporating a portion of the principals of the present invention is generally indicated at 10 and an embodiment of a fastener receiving device incorporating certain of the principals of the present invention in the form of a door latch assembly with rosette is generally indicated at 12, both being formed from usual materials and by usual manufacturing procedures except as hereinafter specifically pointed out. Furthermore, although the principals of the present invention are herein illustrated for use in securing door latches in doors, it should be clearly understood that the principals of the present invention are applicable to many various fastener and fastener receiving device assemblies where the conditions of use require the anti-backout resistance of the fasteners as herein illustrated and described, and it is not intended to limit the principals of the present invention to the specific uses herein illustrated.

The fastener generally indicated at 10 is a threaded fastener including a usual threaded shank 14 having a usual enlarged head 16 at the trailing end thereof forming an annular head under surface generally indicated at 18 extending between the shank and head peripheries facing the fastener leading end. More particularly to the principals of the present invention, the head under surface 18 is formed with generally axially extending diametrically opposite and radially oriented shoulders 20, both circumferentially facing the opposite circumferential direction of progressive threaded rotational engagement of the threaded shank 14, in other words, facing circumferentially opposite the rotational direction of movement required for engaging the threaded shank with the fastener receiving device, or, in this case, the door latch assembly with rosette 12. Axially viewing the head under surface 18, as shown in FIGS. 2 and 6 the head under surface 18 extends from each one of the shoulders 20 in the shoulder facing circumferential direction, in this particular case, counter clockwise as ultimately installed but clockwise as axially viewed and shown in FIGS. 2 and 6, at a recessed surface level for about 27° of the circumference and then progressively on a uniform helical incline circumferentially preferably about 63° to a raised surface level and then continuing at a raised surface level the remaining approximate 90° to the other shoulder 20, thereby in each case defining a flat fully recessed surface portion 22 for approximately 27° of circumference leading smoothly into an upward inclined helical surface portion 24 for approximately 63° and finally smoothly into a flat raised surface portion 26 for the remaining approximately 90° to the other shoulder 20.

The fastener receiving device, in this case formed partially by the rosette 28, is, for the main part, of usual construction and the rosette is formed by a rosette plate of generally usual construction as normally provided in such door latch assemblies with certain exceptions to be described. As shown, the rosette has the usual outer circular periphery 30 and the circular center opening 32, the latter for receiving the usual latch actuating mechanism therethrough, not shown. The rosette 28 also includes the usual spaced and diametrically oriented fastener openings 34 therethrough, each surrounded by outwardly facing, annular receiving surfaces 36 radially outward of the fastener openings for abuttment by the fastener head under surface 18 when the fasteners 10 are installed. The fastener threaded shanks 14, upon such installation, extend through the rosette fastener openings 34 and threadably engage into internally threaded studs 38 of conventional form and as commonly used in latch assemblies, it being obvious that in other applications of fastener and fastener receiving device constructions, the receiving surfaces, such as the rosette receiving surfaces 36, could be on the same member threadably receiving the threaded shanks 14 of the fasteners 10.

Again, more particularly to the principals of the present invention, the rosette receiving surfaces 36 each are formed somewhat a mirror image of the facing fastener head under surfaces 18, each of the rosette receiving surfaces 36, therefore, is formed with spaced, preferably diametrically opposite, axially and radially extending shoulders 40, which, in this case, face clockwise as viewed in FIGS. 3, 7 and 8, or opposite and facing the fastener shoulders 20 during installation of the fasteners 10. Between the shoulders 40 in the clockwise direction as viewed, the rosette receiving surfaces each define a flat fully recessed surface portion 42 from the particular shoulder 40 for approximately 45° of circumference leading smoothly into a progressively upwardly inclined helical surface portion 44 for approximately 95° and then into a flat raised surface portion 46 for approximately 40° to the top of the other shoulder 40. Thus, the rosette receiving surface presents a somewhat mirror image of the facing fastener head under surface 18, but with corresponding surfaces of slightly different circumferentially lengths. Furthermore, for maximum benefit of the anti-backout resistance features of the present invention, the straight axial dimensions or the individual axial heights of the rosette shoulders 40 are greater than the straight axial dimension or straight axial heights of the fastener shoulders 20, thereby permitting full engagement of the fastener shoulders with the rosette shoulders in the anti-backout resistance function as will be further pointed out below.

Completing the improvements in the rosette 28 of the present invention, an arcuate or segmental circumferential slot or cut-out 48 is formed preferably completely through the rosette facing each of the fastener openings 34 spaced between the fastener opening receiving surfaces 36 and the center opening 32, that is, facing and spaced inwardly of each of the fastener opening receiving surfaces 36 and spaced outwardly of the center opening 32, as shown in FIGS. 3 and 4. The purpose of these slots or cut-outs 48 is to add ease of flexure of the rosette 28 during the threaded engagement of the fasteners 10 into the studs 38 and the surface engagement of the fastener head under surfaces 18 with the fastener opening receiving surfaces 36 of the rosette 28 until the respective shoulders 20 and 40 have been properly engaged for providing the anti-backout resistance according to the present invention. With the increased flexure of the rosette 28 provided by the slots or cut-outs 48, it is assured that the proper anti-backout resistance engagement will be permitted and properly take place, and at the same time, greatly aid in preventing fracture of the rosette 28 during this tightening of the fasteners 10, such fracture always being a danger of latch assemblies of the type herein involved even from the normal tightening of such fasteners.

In operation or use of the fastener 10 and the fastener receiving device 12 with the rosette 28, each incorporating their various elements for providing the anti-backout resistance features of the present invention, the fastener threaded shank 14 is inserted through one of the fastener openings 34 of the rosette 28 and is threadably engaged in the usual manner with the associated internally threaded stud 38 axially aligned with that rosette fastener opening. Keeping in mind that the particular fastener 10 herein illustrated has the threads of the threaded shank 14 thereof formed for clockwise progressive threaded engagement of the threaded shank with the associated internally threaded rosette stud 38, as the progressive threaded engagement begins to draw the head under surface 18 of the fastener enlarged head 16 against the annular receiving surface 36 surrounding the particular rosette fastener opening 34, the fastener head under surface shoulders 20 will each freely slide over each of the receiving surface shoulders 40 in view of the fact that these fastener shoulders 20 are always approaching the receiving surface shoulders 40 from the opposite or counter-clockwise direction which is from the high side or flat raised surface portion 26 sides of the fastener shoulders. At the same time, once there has begun appreciable pressure engagement between the fastener head under surface 18 of the particular rosette receiving surface 36, any attempted counter-clockwise or reverse threading of the fastener 10 relative to the rosette receiving surface 36 will cause the fastener head under surface shoulders 20 to engage with the rosette receiving surface shoulders 40, since these respective sets of shoulders face in opposite circumferential directions.

Thus, back-out rotation or counter-clockwise rotation of the fastener 10 is greatly inhibited, if not nearly completely resisted, even using the proper tools for deliberate attempted rotation of the fastener 10. For this reason, once the pressure engagement between the fastener head under surface 18 and the rosette receiving surface 36 is sufficient for fully engaging the fastener shoulders 20 with the rosette receiving surface shoulder 40, any back-out rotation of the fastener from accidental means such as vibrations and impacts is completely eliminated and the fastener is always retained securely with the rosette 28 in the door latch assembly. Despite the steps provided by the various shoulders 20 and 40 between the fastener head under surface 18 and the rosette receiving surface 36, however, full proper pressure and retaining engagement in usual fastener and fastener receiving device manner can be obtained without difficulty by reason of the fact that the axial dimensions of the various shoulders are relatively small considering the overall dimensions of the fasteners 10 and the rosette receiving surface 36 as will be hereinafter illustrated by example, with the additional fact that slight flexures of the metals of the components can take place during and to permit such proper pressure engagement without affecting the final qualities of the fastened assembly, and with the still additional important fact that in the optimum form, the facing inclined helical surface portions 24 and 44 taper relatively gradually over 63° and 95°, respectively, of the fastener head under surface 18 and rosette receiving surface 36 providing an easy progression or establishment of such flexure, all of which is augmented by the rosette slots 48 when provided.

As an example of an actual fastener and fastener receiving device assembly fabricated carrying out the principals of the present invention, using a fastener 10 having a threaded shank 14 with a nominal diameter in the order of 9/64ths inches, the fastener shoulders 20 are formed with straight axial lengths of 0.030 inches. The height of the shoulders 40 on the rosette receiving surfaces 36 or the axial difference between the flat recessed and flat raised surface parts 42 and 46 was 0.050 inches. With such an assembly, sufficient anti-backout resistance is provided for the fasteners 10 in latch assemblies and similar installations to resist loosening from abusive forces normally encountered with a relatively large factor of safety.

In practice of the present invention, if reasonable back-out of the fastener 10 from its threaded engagement once properly engaged is to be permitted by the use of proper tools although still not by vibrations and impacts, which may be a necessity in certain applications, the metal of either the fastener 10 or the rosette 28 should be softer than the metal of the other. In this manner, the softer metal can be permitted to scrape off during the back-out procedure. If back-out resistance, on the other hand, is to be a maximum with back-out movement under normal conditions virtually eliminated even with proper tools, hardened metal on the various mating surfaces and forming the respective shoulders would be used.

It is pointed out that although the arcuate or segmental circumferential slots or cut-outs 48 are used in the preferred embodiment of the rosette 28 herein illustrated and described, such slots or cut-outs are not necessary for for appreciating the full benefits of the anti-backout resistance of the present invention, but in the optimum form of the rosette 28, such slots or cut-outs are preferred and beneficial and particularly in the particular contour and form of rosette shown. It is not, however, intended to limit the principals of the present invention to the use of such slots or cut-outs 48 nor the particular embodiments of fastener 10 and rosette 28 illustrated. Furthermore, it is obvious that a large portion of the anti-backout resistance provided by the particular embodiment illustrated can be gained merely by using single of the shoulders 20 and 40 on the fasteners 10 and rosettes 28 while lengthening out circumferentially the various surface portions between the recessed and raised end limits of these shoulders, as can the anti-backout resistance be increased by providing greater multiples of such shoulders.

Thus, according to the principals of the present invention, fastener and fastener receiving device constructions are provided of relatively simple form, yet which ensure retention of engagement of the fasteners in the fastener receiving devices under relatively high vibratory, impact and other abusive forces which would normally tend to reversely thread or back-out the fasteners from their intended engagement. Despite such unique features, however, the fasteners are still easily engageable in the usual manner with the fastener receiving devices and are not adversely affected from the aesthetic standpoint. The required structure for the unique anti-backout resistance features of the present invention are formed directly on the surfaces of the respective parts of the assembly requiring minimum space while still functioning for their intended purposes in a superior manner from the constructions heretofore provided.

I claim:

1. In a threaded fastener and fastener receiving device construction incorporating anti-backout resistance for use in securing door latch assemblies and the like; the combination of: a fastener including a threaded shank and an enlarged head having an under surface, said fastener head under surface having two generally axially extending and generally radially oriented shoulders formed thereon spaced circumferentially 180°, said shoulders each extending between an under surface recessed surface level and an under surface raised surface level, each of said shoulders facing a circumferential direction opposite a circumferential direction of progressive engagement of said threaded shank in a door latch assembly and the like, said head under surface extending circumferentially from each of said head under surface shoulders in said shoulder facing circumferential direction extending at said under surface recessed surface level for a circumferential distance and then being progressively inclined from said recessed surface level to said raised surface level for a circumferential distance and then extending at said under surface raised surface level for a circumferential distance to the other of said shoulders; and a fastener receiving device in said door latch assembly including an opening of a rosette plate receiving said fastener shank therethrough with said fastener head under surface engaging a receiving surface of said plate radially outward of said opening, two generally axially extending and generally radially oriented shoulders formed on said receiving surface spaced 180° apart and extending between a receiving surface recessed surface level and a receiving surface raised surface level, said receiving surface shoulders each circumferentially facing said fastener under surface shoulders during said fastener head under surface engagement for resisting rotation of said fastener in a direction opposite said circumferential direction of threaded shank progressive engagement, said receiving surface extending circumferentially from each of said shoulders in said shoulder facing direction circumferentially from that particular shoulder at said receiving surface recessed surface level for a circumferential distance and then being inclined progressively circumferentially for a circumferential distance and then extending at said receiving surface raised surface level for a circumferential distance to the other of said shoulders, said rosette plate having arcuate cut-out means formed therethrough outwardly adjacent said receiving surface and generally conforming in curvature to the general circumferential extension of a portion of said receiving surface for providing increased flexure of said fastener receiving device during said fastener head under surface engagement with said receiving surface of said rosette plate, said cut-out means being peripherally surrounded by solid portions of said rosette plate.

2. In a threaded fastener and fastener receiving device construction incorporating anti-backout resistance for use in securing door latch assemblies and the like; the combination of: a fastener including a threaded shank and an enlarged head having an under surface, said head under surface having at least one generally axially extending and generally radially oriented shoulder formed thereon between an under surface recessed surface level and an under surface raised surface level, said shoulder facing a circumferential direction opposite a circumferential direction of progressive engagement of said threaded shank in a door latch assembly and the like, said head under surface in said shoulder facing circumferential direction extending at said recessed surface level from said shoulder for a circumferential distance and then being inclined from said recessed surface level progressively to said raised surface level for a circumferential distance and then extending at said raised surface level for a circumferential distance; and a fastener receiving device in said door latch assembly including an opening of a rosette plate receiving said fastener shank therethrough with said fastener head under surface engaging a receiving surface of said plate radially outward of said opening, a generally axially extending and generally radially oriented shoulder on said receiving surface between a receiving surface recessed surface level and a receiving surface raised surface level circumferentially facing and engageable by said fastener under surface shoulder during said fastener head under surface engagement for resisting rotation of said fastener in a direction opposite said circumferential direction of threaded shank progressive engagement, said receiving surface extending circumferentially in said receiving surface shoulder facing direction at said recessed surface level for a circumferential distance and then being inclined circumferentially progressively for a circumferential distance and then extending at said raised surface level for a circumferential distance, said rosette plate including arcuate cut-out means formed therethrough outwardly adjacent said receiving surface and generally conforming in curvature to the general circumferential extension of a portion of said receiving surface for providing increased flexure of said fastener receiving device during said fastener head under surface engagement with said receiving surface of said rosette plate, said cut-out means being peripherally surrounded by solid portions of said rosette plate.

* * * * *